US008513348B2

(12) United States Patent
Noguchi et al.

(10) Patent No.: US 8,513,348 B2
(45) Date of Patent: Aug. 20, 2013

(54) CARBON NANOFIBERS, METHOD OF PRODUCING CARBON NANOFIBERS, CARBON FIBER COMPOSITE MATERIAL USING CARBON NANOFIBERS, AND METHOD OF PRODUCING THE CARBON FIBER COMPOSITE MATERIAL

(75) Inventors: Toru Noguchi, Nagano (JP); Hiroyuki Ueki, Nagano (JP); Satoshi Iinou, Nagano (JP); Kenji Takeuchi, Nagano (JP)

(73) Assignee: Nissin Kogyo Co., Ltd., Ueda (JP)

( * ) Notice: Subject to any disclaimer, the term of this patent is extended or adjusted under 35 U.S.C. 154(b) by 324 days.

(21) Appl. No.: 12/326,509

(22) Filed: Dec. 2, 2008

(65) Prior Publication Data

US 2010/0009160 A1    Jan. 14, 2010

Related U.S. Application Data

(63) Continuation of application No. PCT/JP2008/062486, filed on Jul. 10, 2008.

(51) Int. Cl.
*B60C 1/00* (2006.01)
*C08K 3/04* (2006.01)

(52) U.S. Cl.
USPC .......................................... 524/496; 524/495

(58) Field of Classification Search
USPC .................................. 524/496, 495
See application file for complete search history.

(56) References Cited

U.S. PATENT DOCUMENTS

| | | | |
|---|---|---|---|
| 4,923,637 A * | 5/1990 | Yagi et al. | ..................... 252/511 |
| 5,853,865 A | 12/1998 | McHugh et al. | |
| 2003/0096104 A1 | 5/2003 | Tobita et al. | |
| 2004/0241440 A1 | 12/2004 | Noguchi et al. | |
| 2005/0075443 A1 | 4/2005 | Noguchi et al. | |
| 2006/0062986 A1 | 3/2006 | Magario et al. | |
| 2006/0079627 A1 | 4/2006 | Noguchi et al. | |
| 2006/0214560 A1 | 9/2006 | Noguchi et al. | |
| 2007/0100058 A1 | 5/2007 | Noguchi et al. | |
| 2007/0112124 A1 | 5/2007 | Noguchi et al. | |
| 2008/0132635 A1 | 6/2008 | Noguchi et al. | |
| 2008/0167417 A1 | 7/2008 | Noguchi et al. | |

FOREIGN PATENT DOCUMENTS

| | | |
|---|---|---|
| EP | 0 296 613 A2 | 12/1988 |
| EP | 1 878 816 A1 | 1/2008 |
| EP | 1 927 625 A1 | 6/2008 |
| JP | A-64-065144 | 3/1989 |
| JP | A-02-298531 | 12/1990 |

(Continued)

OTHER PUBLICATIONS

U.S. Appl. No. 11/475,032, filed Jun. 27, 2006 in the name of Toru Noguchi et al.

(Continued)

*Primary Examiner* — Angela C Scott
(74) *Attorney, Agent, or Firm* — Oliff & Berridge, PLC

(57) ABSTRACT

A method of producing carbon nanofibers includes grinding untreated carbon nanofibers produced by a vapor growth method. The untreated carbon nanofibers are ground so that the ground carbon nanofibers have a tap density 1.5 to 10 times higher than that of the untreated carbon nanofibers. A method of producing a carbon fiber composite material includes mixing carbon nanofibers into an elastomer, and uniformly dispersing the carbon nanofibers in the elastomer by applying a shear force to obtain a carbon fiber composite material.

5 Claims, 1 Drawing Sheet

(56) References Cited

FOREIGN PATENT DOCUMENTS

| | | |
|---|---|---|
| JP | A-03-250503 | 11/1991 |
| JP | A-07-102120 | 4/1995 |
| JP | A-2002-088249 | 3/2002 |
| JP | A-2002-273741 | 9/2002 |
| JP | A-2003-285300 | 10/2003 |
| JP | A-2005-097525 | 4/2005 |
| JP | A-2003-327753 | 11/2005 |
| JP | A-2006-083281 | 3/2006 |
| JP | A-2006-143532 | 6/2006 |
| JP | A-2006-198393 | 8/2006 |
| JP | A-2008-115331 | 5/2008 |

OTHER PUBLICATIONS

U.S. Appl. No. 11/475,033, filed Jun. 27, 2006 in the name of Toru Noguchi et al.

U.S. Appl. No. 11/785,875, filed Apr. 20, 2007 in the name of Toru Noguchi et al.

U.S. Appl. No. 11/987,254, filed Nov. 28, 2007 in the name of Toru Noguchi et al.

U.S. Appl. No. 12/327,396, filed Dec. 3, 2008 in the name of Toru Noguchi et al.

U.S. Appl. No. 12/326,490, filed Dec. 2, 2008 in the name of Toru Noguchi et al.

Jun. 15, 2011 Notification of Reasons for Refusal for Japanese Patent Application No. 2007-155077 w/English translation.

Weidler, "BET Sample Pretreatment of Synthetic Ferrihydrite and its Influence on the Determination of Surface Area and Porosity," Journal of Porous Materials 4, 1997, pp. 165-169.

May 2, 2012 European Search Report issued in EP 08 79 1044.4.

May 16, 2012 Decision of Refusal in Japanese Patent Application No. 2007-155077 (with English translation).

Jun. 1, 2012 European Office Action in European Patent Application No. 08791044.4.

Chinese Office Action dated Dec. 25, 2012 from Chinese Patent Application No. 200880130279.8 (with English-language translation).

\* cited by examiner

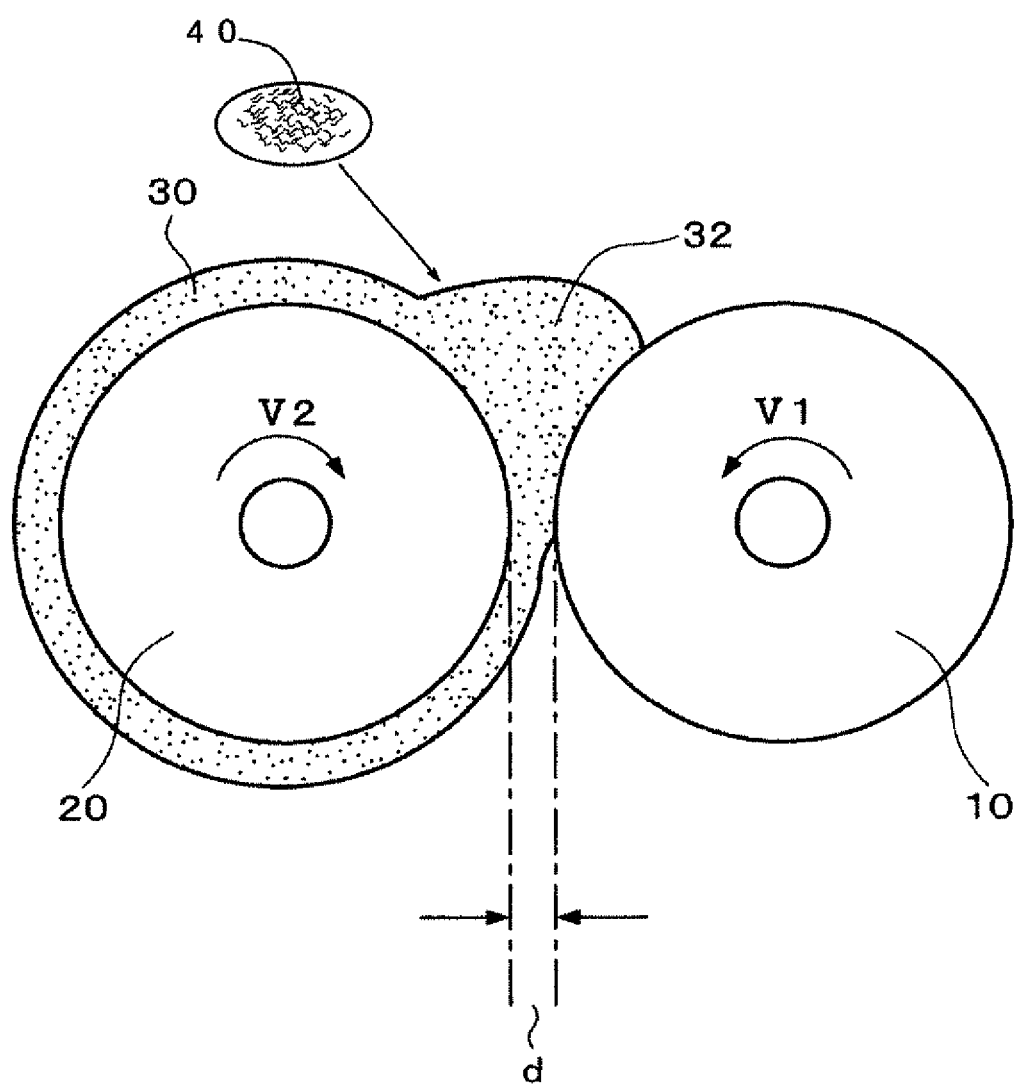

CARBON NANOFIBERS, METHOD OF PRODUCING CARBON NANOFIBERS, CARBON FIBER COMPOSITE MATERIAL USING CARBON NANOFIBERS, AND METHOD OF PRODUCING THE CARBON FIBER COMPOSITE MATERIAL

CROSS REFERENCE TO RELATED APPLICATION

This application is a continuation of International Patent Application No. PCT/JP2008/062486, having an international filing date of Jul. 10, 2008, which designated the United States, the entirety of which is incorporated herein by reference.

BACKGROUND OF THE INVENTION

The present invention relates to carbon nanofibers which exhibit improved wettability with a matrix material, a method of producing the carbon nanofibers, a carbon fiber composite material using the carbon nanofibers, and a method of producing the carbon fiber composite material.

Carbon nanofibers have been known as a filler which is dispersed in a matrix to only a small extent. The inventors of the invention proposed a method of producing a carbon fiber composite material which improves the dispersibility of carbon nanofibers so that the carbon nanofibers can be uniformly dispersed in an elastomer (see JP-A-2005-97525, for example). According to this method of producing a carbon fiber composite material, the elastomer and the carbon nanofibers are mixed so that the dispersibility of the carbon nanofibers with strong aggregating properties is improved due to a shear force. Specifically, when mixing the elastomer and the carbon nanofibers, the viscous elastomer enters the space between the carbon nanofibers while specific portions of the elastomer are bonded to highly active sites of the carbon nanofibers through chemical interaction. When a high shear force is applied to the mixture of the carbon nanofibers and the elastomer having an appropriately long molecular length and a high molecular mobility (exhibiting elasticity), the carbon nanofibers move along with the deformation of the elastomer. The aggregated carbon nanofibers are separated by the restoring force of the elastomer due to its elasticity, and become dispersed in the elastomer. Expensive carbon nanofibers can be efficiently used as a filler for a composite material by thus improving the dispersibility of the carbon nanofibers in the matrix.

Carbon nanofibers are industrially mass-produced by a vapor growth method that pyrolyzes a gas such as a hydrocarbon gas in the presence of a metal catalyst. Carbon nanofibers which are mass-produced by the vapor growth method in a heating furnace at about 1000° C. and further graphitized by heating at a higher temperature have been known (see JP-A-2006-198393, for example). JP-A-2006-198393 discloses that the heating temperature for graphitizing the carbon nanofibers is 2000° C. or more, preferably 2500° C. or more, and particularly preferably 2800 to 3200° C. or more. The carbon nanofibers thus graphitized have a surface with a small number of defects. However, such carbon nanofibers exhibit poor wettability with a matrix material (e.g., elastomer).

SUMMARY

According to a first aspect of the invention, there is provided a method of producing carbon nanofibers comprising:

grinding untreated carbon nanofibers produced by a vapor growth method, the untreated carbon nanofibers being ground so that the ground carbon nanofibers have a tap density 1.5 to 10 times higher than a tap density of the untreated carbon nanofibers.

According to a second aspect of the invention, there is provided carbon nanofibers produced by the above-described method of producing carbon nanofibers, the carbon nanofibers having a tap density of 0.03 to 0.2 g/cm$^3$.

According to a third aspect of the invention, there is provided a method of producing a carbon fiber composite material comprising:

mixing carbon nanofibers produced by the above-described method of producing carbon nanofibers into an elastomer; and uniformly dispersing the carbon nanofibers in the elastomer by applying a shear force to obtain a carbon fiber composite material.

According to a fourth aspect of the invention, there is provided a carbon fiber composite material produced by the above-described method of producing a carbon fiber composite material, the carbon fiber composite material comprising:

15 to 160 parts by weight of the carbon nanofibers based on 100 parts by weight of the elastomer, the carbon fiber composite material having an elongation at break at 23° C. of 50% or more, and a rate of increase in 100% modulus with respect to the 100% modulus of the elastomer of 12% or more per part by weight of the carbon nanofibers mixed into 100 parts by weight of the elastomer.

BRIEF DESCRIPTION OF THE SEVERAL VIEWS OF THE DRAWING

FIG. 1 is an explanatory view schematically showing a method of producing a carbon fiber composite material using an open-roll method.

DETAILED DESCRIPTION OF THE EMBODIMENT

The invention may provide carbon nanofibers which exhibit improved wettability with a matrix material, a method of producing the carbon nanofibers, a carbon fiber composite material using the carbon nanofibers, and a method of producing the carbon fiber composite material.

According to one embodiment of the invention, there is provided a method of producing carbon nanofibers comprising:

grinding untreated carbon nanofibers produced by a vapor growth method, the untreated carbon nanofibers being ground so that the ground carbon nanofibers have a tap density 1.5 to 10 times higher than that of the untreated carbon nanofibers.

The method of producing carbon nanofibers can produce carbon nanofibers which exhibit improved surface reactivity and wettability with a matrix material (e.g., elastomer).

In this method of producing carbon nanofibers, the untreated carbon nanofibers may be ground so that the ground carbon nanofibers have a specific surface area by nitrogen adsorption 1.1 to 5.0 times higher than that of the untreated carbon nanofibers.

The method of producing carbon nanofibers may further comprise heating the untreated carbon nanofibers at 2000 to 3200° C. before grinding.

In this method of producing carbon nanofibers, the untreated carbon nanofibers may have an average diameter of 70 to 100 nm.

In this method of producing carbon nanofibers, the untreated carbon nanofibers may be dry-ground by utilizing impact and/or a shear force.

According to one embodiment of the invention, there is provided carbon nanofibers produced by the above-described method of producing carbon nanofibers, the carbon nanofibers having a tap density of 0.03 to 0.2 g/cm$^3$.

The carbon nanofibers exhibit improved surface reactivity and excellent wettability with a matrix material (e.g., elastomer) as a result of grinding.

The carbon nanofibers may have a specific surface area by nitrogen adsorption of 22 to 100 m$^2$/g.

According to one embodiment of the invention, there is provided a method of producing a carbon fiber composite material comprising:

mixing carbon nanofibers produced by the above-described method of producing carbon nanofibers into an elastomer; and uniformly dispersing the carbon nanofibers in the elastomer by applying a shear force to obtain a carbon fiber composite material.

According to one embodiment of the invention, there is provided a carbon fiber composite material produced by the above-described method of producing a carbon fiber composite material, the carbon fiber composite material comprising:

15 to 160 parts by weight of the carbon nanofibers based on 100 parts by weight of the elastomer, the carbon fiber composite material having an elongation at break at 23° C. of 50% or more, and a rate of increase in 100% modulus with respect to the 100% modulus of the elastomer of 12% or more per part by weight of the carbon nanofibers mixed into 100 parts by weight of the elastomer.

The carbon fiber composite material allows the carbon nanofibers to exhibit improved wettability with the elastomer, and exhibits improved rigidity and 100% modulus due to the carbon nanofibers.

The carbon fiber composite material in uncrosslinked form may have a spin-spin relaxation time (T$2s$/150° C.), measured at 150° C. by the solid-echo method using a pulsed NMR technique with $^1$H as an observing nucleus, of 5 to 600 microseconds; and the carbon fiber composite material in uncrosslinked form may have a first spin-spin relaxation time (T$2n$), measured at 150° C. by the Hahn-echo method using the pulsed NMR technique with $^1$H as an observing nucleus, of 100 to 3000 microseconds, and a fraction (fnn) of components having a second spin-spin relaxation time of 0 to 0.2.

Embodiments of the invention are described in detail below.

A method of producing carbon nanofibers according to one embodiment of the invention includes grinding untreated carbon nanofibers produced by a vapor growth method, the untreated carbon nanofibers being ground so that the ground carbon nanofibers have a tap density 1.5 to 10 times higher than that of the untreated carbon nanofibers.

Carbon nanofibers according to one embodiment of the invention are produced by the above production method and have a tap density of 0.03 to 0.2 g/cm$^3$.

A method of producing a carbon fiber composite material according to one embodiment of the invention includes mixing carbon nanofibers produced by the above production method into an elastomer, and uniformly dispersing the carbon nanofibers in the elastomer by applying a shear force to obtain a carbon fiber composite material.

A carbon fiber composite material according to one embodiment of the invention is produced by the above production method and includes 15 to 160 parts by weight of the carbon nanofibers based on 100 parts by weight of the elastomer; the carbon fiber composite material having an elongation at break at 23° C. of 50% or more and a rate of increase in 100% modulus with respect to the 100% modulus of the elastomer of 12% or more per part by weight of the carbon nanofibers mixed into 100 parts by weight of the elastomer.

(I) Method of Producing Carbon Nanofibers

The method of producing carbon nanofibers according to one embodiment of the invention is described below.

The method of producing carbon nanofibers includes grinding untreated carbon nanofibers produced by a vapor growth method, the untreated carbon nanofibers being ground so that the ground carbon nanofibers have a tap density 1.5 to 10 times higher than that of the untreated carbon nanofibers. The untreated carbon nanofibers are preferably ground so that the ground carbon nanofibers have a specific surface area by nitrogen adsorption 1.1 to 5.0 times higher than that of the untreated carbon nanofibers. The term "untreated carbon nanofibers" used herein refers to carbon nanofibers before being ground. The method of producing carbon nanofibers according to the invention can produce carbon nanofibers which exhibit improved surface reactivity and wettability with a matrix material (e.g., elastomer).

The vapor growth method pyrolyzes a gas such as a hydrocarbon gas in the presence of a metal catalyst to produce untreated carbon nanofibers. As the vapor growth method, a method that introduces an organic compound (e.g., benzene or toluene) (i.e., raw material) and an organotransition metal compound (e.g., ferrocene or nickelocene) (i.e., metal catalyst) into a reaction furnace set at a high temperature (e.g., 400 to 1000° C.) together with a carrier gas to produce untreated carbon nanofibers on a substrate, a method that produces untreated carbon nanofibers in a floating state, a method that causes untreated carbon nanofiber to be grown on the wall of the reaction furnace, or the like may be used. Alternatively, metal-containing particles supported on a fire-resistant support (e.g., alumina or carbon) may be caused to come in contact with a carbon-containing compound at a high temperature to obtain untreated carbon nanofibers having a diameter of 70 nm or less. The average diameter of the untreated carbon nanofibers produced by the vapor growth method is preferably 1 to 350 nm, more preferably 10 to 300 nm or 50 to 200 nm, and particularly preferably 70 to 100 nm. If the diameter of the untreated carbon nanofibers is 1 nm or more, dispersibility in a matrix resin is improved. If the diameter of the untreated carbon nanofibers is 350 nm or less, the surface flatness of the matrix resin is rarely impaired. The aspect ratio of the untreated carbon nanofibers is preferably 50 to 200.

The untreated carbon nanofibers produced by the vapor growth method have a low degree of surface activation and may not be uniformly dispersed in the matrix material. Therefore, the untreated carbon nanofibers are ground. The untreated carbon nanofibers have defects such as a branched portion (i.e., the fiber is branched) and a bent portion (i.e., the fiber is bent). Such defects are reduced by grinding the untreated carbon nanofibers so that the carbon nanofibers break in the branched portion and the bent portion. Moreover, the surface of the carbon nanofiber is reduced by grinding, the strength of each fiber is improved. Moreover, since the untreated carbon nanofibers are ground to such an extent that the fiber length is reduced to only a small extent, the properties of a composite material using the resulting carbon nanofibers are improved. Since the surface of carbon nanofibers is activated, the carbon nanofibers exhibit improved surface reactivity with a matrix material so that nonuniform dispersion of the carbon nanofibers in the matrix material can be suppressed.

The untreated carbon nanofibers produced by the vapor growth method may be heated at 2000 to 3200° C. in an inert gas atmosphere before grinding the untreated carbon nanofibers. The heating temperature is more preferably 2500 to 3200° C., and particularly preferably 2800 to 3200° C. If the heating temperature is 2000° C. or more, impurities such as amorphous products deposited on the surface of the carbon nanofibers during vapor growth and the remaining metal catalyst can be removed. If the heating temperature is 2500° C. or less, the skeleton of the carbon nanofibers is graphitized (crystallized) so that defects of the carbon nanofibers are reduced, whereby the strength of the carbon nanofibers is improved. If the heating temperature is 3200° C. or less, breakage of the graphite skeleton due to graphite sublimation occurs to only a small extent. Note that the wettability of the carbon nanofibers with a matrix material is improved by moderate grinding without heating the carbon nanofibers.

The carbon nanofibers are preferably dry-ground utilizing impact and/or a shear force. The carbon nanofibers may be dry-ground in the absence of water and/or an organic solvent, for example. When the carbon nanofibers are dry-ground, a post-process including removing a dispersant after grinding, drying a solvent, and disentangling the dried and entangled fibers is unnecessary. The carbon nanofibers are preferably dry-ground at a peripheral speed of 50 to 200 m/s for 0.5 to 60 minutes. A high-speed rotary mill, a ball mill, a medium stirring mill, a jet grinder, or the like may be used to dry-grind the carbon nanofibers. It is preferable to use a vibrating ball mill (e.g., rotary grinder, circular vibrating mill, or centrifugal mill) that crushes the fibers utilizing an impact force.

The ground carbon nanofibers have a tap density 1.5 to 10 times higher than that of the untreated carbon nanofibers. The wettability with a matrix material (e.g., elastomer) can be improved by moderate grinding by hardly changing the lengths of the carbon nanofibers. The ground carbon nanofibers preferably have a tap density of 0.03 to 0.2 g/cm$^3$. The term "tap density" refers to an apparent density measured by a tap method, and indicates the bulkiness of the carbon nanofibers. Therefore, when the number of branched portions and defects of the carbon nanofibers is reduced by grinding, the filling density increases so that the tap density tends to increase. The ground carbon nanofibers having a tap density within the above range exhibit excellent wettability with a matrix material (e.g., elastomer).

The ground carbon nanofibers preferably have a specific surface area by nitrogen adsorption 1.1 to 5.0 times higher than that of the untreated carbon nanofibers. The number of contact points (contact area) between the matrix material and the carbon nanofibers increases due to an increase in specific surface area by nitrogen adsorption so that the carbon nanofibers are easily dispersed in the matrix material. The ground carbon nanofibers preferably have a specific surface area by nitrogen adsorption of 22 to 100 m$^2$/g. The ground carbon nanofibers having a specific surface area by nitrogen adsorption within the above range exhibit excellent wettability with a matrix material (e.g., elastomer).

The amount of the carbon nanofibers added to the matrix material may be determined depending on the application. A crosslinked elastomer or an uncrosslinked elastomer may be used as an elastomer material for the carbon fiber composite material. The carbon fiber composite material may be used as a raw material for a metal or resin composite material. The carbon fiber composite material as a raw material for a metal or resin composite material may be used as a masterbatch (i.e., carbon nanofiber source) when mixing the carbon nanofibers into a metal or a resin.

As examples of the carbon nanofibers, a carbon nanotube and the like can be mentioned. The carbon nanotube has a structure in which a graphite hexagonal carbon layer is rolled in one or more layers. A carbon material having a partial carbon nanotube structure may also be used. The carbon nanotube may also be referred to as a graphite fibril nanotube or a vapor-grown carbon fiber.

(II) Elastomer

The elastomer used in the method of producing a carbon fiber composite material is described below.

The elastomer preferably has a molecular weight of 5000 to 5,000,000, and more preferably 20,000 to 3,000,000. If the molecular weight of the elastomer is within the above range, the elastomer molecules are entangled and linked. Therefore, the elastomer exhibits excellent elasticity that allows the carbon nanofibers to be dispersed. Since the elastomer exhibits viscosity, the elastomer easily enters the space between the aggregated carbon nanofibers. Moreover, the elastomer allows the carbon nanofibers to be separated due to its elasticity.

The network component of the elastomer in uncrosslinked form preferably has a spin-spin relaxation time ($T2n/30°$ C.), measured for $^1$H at 30° C. by a Hahn-echo method using a pulsed nuclear magnetic resonance (NMR) technique, of 100 to 3000 microseconds, and more preferably 200 to 1000 microseconds. If the elastomer has a spin-spin relaxation time ($T2n/30°$ C.) within the above range, the elastomer exhibits flexibility and has sufficiently high molecular mobility. Specifically, the elastomer exhibits appropriate elasticity for dispersing the carbon nanofibers. Moreover, since the elastomer exhibits viscosity, the elastomer can easily enter the space between the carbon nanofibers due to high molecular mobility when mixing the elastomer and the carbon nanofibers.

The network component of the elastomer in crosslinked form preferably has a spin-spin relaxation time ($T2n$), measured for $^1$H at 30° C. by the Hahn-echo method using the pulsed NMR technique, of 100 to 2000 microseconds. The reasons therefor are the same as those described for the uncrosslinked form. Specifically, when crosslinking the elastomer in uncrosslinked form satisfying the above conditions, the spin-spin relaxation time ($T2n$) of the resulting elastomer in crosslinked form almost falls within the above range.

The spin-spin relaxation time determined by the Hahn-echo method using the pulsed NMR technique is a measure that indicates the molecular mobility of a substance. Specifically, when measuring the spin-spin relaxation time of the elastomer by the Hahn-echo method using the pulsed NMR technique, a first component having a shorter first spin-spin relaxation time ($T2n$) and a second component having a longer second spin-spin relaxation time ($T2nn$) are detected. The first component corresponds to the network component (backbone molecule) of the polymer, and the second component corresponds to the non-network component (branched component such as a terminal chain) of the polymer. The shorter the first spin-spin relaxation time, the lower the molecular mobility and the harder the elastomer. The longer the first spin-spin relaxation time, the higher the molecular mobility and the softer the elastomer.

As the measurement method using the pulsed NMR technique, a solid-echo method, a Carr-Purcell-Meiboom-Gill (CPMG) method, or a 90-degree pulse method may be used instead of the Hahn-echo method. Since the elastomer according to the invention has a medium spin-spin relaxation time ($T2$), the Hahn-echo method is most suitable. In general, the solid-echo method and the 90-degree pulse method are suitable for measuring a short spin-spin relaxation time ($T2$), the Hahn-echo method is suitable for measuring a medium spin-spin relaxation time (T2), and the CPMG method is suitable for measuring a long spin-spin relaxation time (T2).

At least one of the main chain, side chain, and terminal chain of the elastomer includes an unsaturated bond or a group having affinity to the carbon nanofibers (particularly to terminal radicals of the carbon nanofibers), or the elastomer has properties of readily producing such a radical or group. The unsaturated bond or group may be at least one unsaturated bond or group selected from a double bond, a triple bond, and functional groups such as a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

In this embodiment, since at least one of the main chain, side chain, and terminal chain of the elastomer includes an unsaturated bond or a group having high affinity (reactivity or polarity) to radicals of the carbon nanofibers, the elastomer and the carbon nanofibers can be bonded. This enables the carbon nanofibers to be easily dispersed against the aggregating force of the carbon nanofibers. When mixing the elastomer and the carbon nanofibers, free radicals produced due to breakage of the elastomer molecules attack the defects of the carbon nanofibers to produce radicals on the surface of the carbon nanofibers.

As the elastomer, an elastomer such as natural rubber (NR), epoxidized natural rubber (ENR), styrene-butadiene rubber (SBR), nitrile rubber (NBR), chloroprene rubber (CR), ethylene propylene rubber (EPR or EPDM), butyl rubber (IIR), chlorobutyl rubber (CIIR), acrylic rubber (ACM), silicone rubber (Q), fluorine rubber (FKM), butadiene rubber (BR), epoxidized butadiene rubber (EBR), epichlorohydrin rubber (CO or CEO), urethane rubber (U), or polysulfide rubber (T); a thermoplastic elastomer such as an olefin-based elastomer (TPO), a polyvinyl chloride-based elastomer (TPVC), a polyester-based elastomer (TPEE), a polyurethane-based elastomer (TPU), a polyamide-based elastomer (TPEA), or a styrene-based elastomer (SBS), or a mixture of these elastomers may be used. It is particularly preferable to use a highly polar elastomer which readily produces free radicals when mixing the elastomer, such as natural rubber (NR) or nitrile rubber (NBR). An elastomer having a low polarity (e.g., ethylene propylene rubber (EPDM)) may also be used in the invention, since such an elastomer also produces free radicals when the mixing temperature is adjusted to a relatively high temperature (e.g., 50° C. to 150° C. for EPDM).

The elastomer according to this embodiment may be either a rubber elastomer or a thermoplastic elastomer. When using a rubber elastomer, the elastomer may be in crosslinked form or uncrosslinked form. It is preferable to use an elastomer in uncrosslinked form (III) Carbon Fiber Composite Material The carbon fiber composite material is described below.

In the carbon fiber composite material, the ground carbon nanofibers are uniformly dispersed in the elastomer. Since the ground carbon nanofibers exhibit improved wettability with the elastomer and have only a small number of branched portions and bent portions, a highly rigid carbon fiber composite material is obtained.

The carbon fiber composite material in uncrosslinked form preferably has a spin-spin relaxation time (T2$s$/150° C.), measured for $^1$H at 150° C. by the Hahn-echo method using the pulsed NMR technique, of 5 to 600 microseconds, a first spin-spin relaxation time (T2$n$), measured for $^1$H at 150° C. by the Hahn-echo method using the pulsed NMR technique, of 100 to 3000 microseconds, and a fraction (fnn) of components having a second spin-spin relaxation time of 0 to 0.2.

The spin-spin relaxation times (T2$s$, T2$m$, and T2$l$) measured by the solid-echo method are measures that indicate the molecular mobility of a rubber composition. The spin-spin relaxation time (T2$s$) of the carbon fiber composite material is detected, but the spin-spin relaxation times (T2$m$ and T2$l$) of the carbon fiber composite material are detected to only a small extent. Since the spin-spin relaxation time (T2$s$) is affected to a large extent by magnetic field non-uniformity, the spin-spin relaxation time (T2$s$) can be used as a measure that indicates the non-uniformity of the internal structure of the carbon fiber composite material. The carbon fiber composite material in which the ground carbon nanofibers are dispersed shows a reduced spin-spin relaxation time (T2$s$/150° C.) measured at 150° C. by the solid-echo method.

The first spin-spin relaxation time (T2$n$) and the fraction (fnn) of the carbon fiber composite material indicate whether or not the carbon nanofibers are uniformly dispersed in the elastomer (matrix). Specifically, when the carbon nanofibers are uniformly dispersed in the elastomer, the elastomer is restrained by the carbon nanofibers. In this state, the mobility of the elastomer molecules restrained by the carbon nanofibers is lower than that of the elastomer molecules which are not restrained by the carbon nanofibers. Therefore, the first spin-spin relaxation time (T2$n$), the second spin-spin relaxation time (T2$nn$), and the spin-lattice relaxation time (T1) of the carbon fiber composite material are shorter than those of the elastomer which does not include the carbon nanofibers. In particular, the first spin-spin relaxation time (T2$n$), the second spin-spin relaxation time (T2$nn$), and the spin-lattice relaxation time (T1) are further reduced when the carbon nanofibers are uniformly dispersed.

When the elastomer molecules are restrained by the carbon nanofibers, the number of non-network components (non-reticulate chain components) is considered to be reduced for the following reasons. Specifically, when the molecular mobility of the entire elastomer decreases due to the carbon nanofibers, the number of non-network components which cannot easily move increases, whereby the non-network components tend to behave in the same manner as the network components. Moreover, since the non-network components (terminal chains) easily move, the non-network components tend to be adsorbed on the active sites of the carbon nanofibers. It is considered that these phenomena decrease the number of non-network components. Therefore, the fraction (fnn) of components having the second spin-spin relaxation time (T2$nn$) becomes smaller than that of the elastomer which does not include the carbon nanofibers since fn+fnn=1. Accordingly, when the carbon fiber composite material has values measured by the Hahn-echo method using the pulsed NMR technique within the above ranges, the carbon nanofibers are uniformly dispersed in the carbon fiber composite material.

The carbon fiber composite material includes 15 to 160 parts by weight (phr) of the carbon nanofibers based on 100 parts by weight (phr) of the elastomer. The carbon fiber composite material has an elongation at break at 23° C. of 50% or more and a rate of increase in 100% modulus with respect to the 100% modulus of the elastomer of 12% or more per part by weight of the carbon nanofibers mixed into 100 parts by weight of the elastomer. The rate of increase in 100% modulus is calculated by measuring the 100% modulus of the elastomer and the 100% modulus of the carbon fiber composite material, calculating the difference between the 100% modulus of the elastomer and the 100% modulus of the carbon fiber composite material, dividing the difference by the 100% modulus of the elastomer, and dividing the resulting value by the amount (parts by weight) of the carbon nanofibers. When the carbon fiber composite material includes carbon black or the like in addition to the carbon nanofibers, an increase in 100% modulus due to the carbon black or the like is subtracted from the 100% modulus of the carbon fiber composite material.

(IV) Method of Producing Carbon Fiber Composite Material

A method of producing the carbon fiber composite material is described below.

FIG. 1 is an explanatory view schematically showing a method of producing the carbon fiber composite material using an open-roll method.

The network component of the elastomer (raw material) in uncrosslinked form preferably has a spin-spin relaxation time (T$2n$), measured for $^1$H at 150° C. by the Hahn-echo method using the pulsed NMR technique, of 100 to 3000 microseconds. As shown in FIG. 1, a first roll 10 and a second roll 20 are disposed at a predetermined distance d (e.g., 0.5 to 1.0 mm). The first roll 10 and the second roll 20 are respectively rotated at rotational speeds V1 and V2 in the directions indicated by arrows in FIG. 1 or in the reverse directions. An elastomer 30 wound around the first roll 10 is masticated. This causes the molecular chain of the elastomer to be moderately cut to produce free radicals. Since the surfaces of the ground carbon nanofibers have been moderately activated, radicals and functional groups are easily produced so that free radicals of the elastomer produced by mastication are easily bonded to the carbon nanofibers.

Ground carbon nanofibers 40 are then supplied to a bank 34 of the elastomer 30 wound around the first roll 10, and the elastomer 30 and the carbon nanofibers 40 are mixed. The elastomer 30 and the carbon nanofibers 40 may be mixed by an internal mixing method or a multi-screw extrusion kneading method instead of the open-roll method.

After setting the distance d between the first roll 10 and the second roll 20 preferably at 0.5 mm or less, and more preferably 0 to 0.5 mm, the mixture is supplied to the open rolls and tight-milled a plurality of times. The mixture is preferably tight-milled about five to ten times, for example. When the surface velocity of the first roll 10 is referred to as V1 and the surface velocity of the second roll 20 is referred to as V2, the surface velocity ratio (V1/V2) of the first roll 10 to the second roll 20 during tight milling is preferably set at 1.05 to 3.00, and more preferably 1.05 to 1.2. A desired shear force can be obtained using such a surface velocity ratio. A carbon fiber composite material obtained by tight milling is sheeted by the rolls. In the tight milling step, the elastomer 30 is preferably tight-milled while setting the roll temperature at a relatively low temperature (preferably 0 to 50° C., and more preferably 5 to 30° C.) in order to obtain a shear force as high as possible. The temperature of the elastomer 30 measured is preferably adjusted to 0 to 50° C. This causes a high shear force to be applied to the elastomer 30, whereby the aggregated carbon nanofibers 40 are separated so that the carbon nanofibers 40 are removed one by one by the elastomer molecules and become dispersed in the elastomer 30. In particular, since the elastomer 30 has elasticity, viscosity, and chemical interaction with the carbon nanofibers 40, the carbon nanofibers 40 are easily dispersed in the elastomer 30. As a result, a carbon fiber composite material in which the carbon nanofibers 40 exhibit excellent dispersibility and dispersion stability (i.e., the carbon nanofibers rarely re-aggregate) can be obtained.

Specifically, when mixing the elastomer and the carbon nanofibers using the open rolls, the viscous elastomer enters the space between the carbon nanofibers, and specific portions of the elastomer are bonded to highly active sites of the carbon nanofibers through chemical interaction. Since the carbon nanofibers have a moderately active surface, the carbon nanofibers are easily bonded to the elastomer molecules. When a high shear force is then applied to the elastomer, the carbon nanofibers move along with the movement of the elastomer molecules so that the aggregated carbon nanofibers are separated by the restoring force of the elastomer due to its elasticity after shearing, and become dispersed in the elastomer. According to this embodiment, when the carbon fiber composite material is extruded through the narrow space between the rolls, the carbon fiber composite material is deformed to a thickness greater than the roll distance as a result of the restoring force of the elastomer due to its elasticity. It is considered that the above deformation causes the carbon fiber composite material to which a high shear force is applied to flow in a more complicated manner to disperse the carbon nanofibers in the elastomer. The dispersed carbon nanofibers are prevented from re-aggregating due to chemical interaction with the elastomer so that excellent dispersion stability can be obtained.

The carbon nanofibers may be dispersed in the elastomer due to a shear force using the internal mixing method or the multi-screw extrusion kneading method instead of the open-roll method. In this step, it suffices that a shear force sufficient to separate the aggregated carbon nanofibers be applied to the elastomer. It is particularly preferable to use the open-roll method because the actual temperature of the mixture can be measured and controlled while controlling the roll temperature.

A crosslinking agent may be mixed into the carbon fiber composite material which has been tight-milled and sheeted, and the carbon fiber composite material may be crosslinked to obtain a crosslinked carbon fiber composite material. Note that the carbon fiber composite material may be molded without crosslinking the carbon fiber composite material. The carbon fiber composite material may be used in the form of a sheet obtained by the open-roll method. Alternatively, the carbon fiber composite material obtained by a step (d) may be molded into a desired shape (e.g., sheet) using a generally-used rubber molding method such as injection molding, transfer molding, press molding, extrusion molding, or calendering.

In the method of producing the carbon fiber composite material according to this embodiment, a compounding ingredient usually used when processing an elastomer may be added. As the compounding ingredient, a known compounding ingredient may be used. Examples of the compounding ingredient include a crosslinking agent, a vulcanizing agent, a vulcanization accelerator, a vulcanization retarder, a softener, a plasticizer, a curing agent, a reinforcing agent, a filler, an aging preventive, a colorant, and the like. These compounding ingredients may be added to the elastomer before supplying the carbon nanofibers to the open rolls, for example.

In the method of producing the carbon fiber composite material according to this embodiment, the carbon nanofibers are directly mixed into the elastomer having rubber elasticity. Note that the following method may also be employed. Specifically, the elastomer is masticated before mixing the carbon nanofibers into the elastomer to reduce the molecular weight of the elastomer. Since the viscosity of the elastomer decreases due to a decrease in molecular weight as a result of mastication, the elastomer easily enters the space between the aggregated carbon nanofibers. The raw material elastomer is a rubber elastic body of which the network component in uncrosslinked form has a spin-spin relaxation time (T$2n$), measured for $^1$H at 30° C. by the Hahn-echo method using the pulsed NMR technique, of 100 to 3000 microseconds. The raw material elastomer is masticated to reduce the molecular weight of the elastomer to obtain a liquid elastomer having a first spin-spin relaxation time (T$2n$) of more than 3000 microseconds. The first spin-spin relaxation time (T$2n$) of the liquid elastomer after mastication is preferably 5 to 30 times longer than the first spin-spin relaxation time (T$2n$) of the raw material elastomer before mastication. The above mastication is performed until the elastomer is liquefied (i.e., until the elastomer exhibits fluidity which is not suitable for mixing) by cutting the molecules of the elastomer by applying a high shear force using the open-roll method or the like to reduce the molecular weight of the elastomer to a large extent, differing from normal mastication performed in a state in which the elastomer is solid. For example, when using the open-roll method, the elastomer is masticated at a roll temperature of 20° C. (minimum mastication time: 60 minutes) to 150° C. (minimum mastication time: 10 minutes). The roll distance d is set at 0.5 to 1.0 mm, for example. The carbon nanofibers are then supplied to the liquid elastomer obtained by mastication. However, since the elasticity of the liquid elastomer has been reduced to a large extent, the aggregated carbon nanofibers are dispersed to only a small extent even if the elastomer and the carbon nanofibers are mixed in a state in which free radicals of the elastomer are bonded to the carbon nanofibers.

Therefore, the molecular weight of the elastomer in the mixture obtained by mixing the liquid elastomer and the carbon nanofibers is increased so that the elastomer recovers its elasticity to obtain a rubber elastic body mixture, and the carbon nanofibers are then uniformly dispersed in the elastomer by tight milling using the open-roll method and the like. The mixture in which the molecular weight of the elastomer has been increased is a rubber elastic body of which the network component has a first spin-spin relaxation time (T$2n$), measured for $^1$H at 30° C. by the Hahn-echo method using the pulsed NMR technique, of 3000 microseconds or less. The first spin-spin relaxation time (T$2n$) of the rubber elastic body mixture in which the molecular weight of the elastomer has been increased is preferably 0.5 to 10 times higher than the first spin-spin relaxation time (T$2n$) of the raw material elastomer before mastication. The elasticity of the rubber elastic mixture may be expressed by the molecular form (which may be observed from the molecular weight) or the molecular mobility (which may be observed from the first spin-spin relaxation time (T$2n$)) of the elastomer. The molecular weight of the elastomer is preferably increased by heating the mixture in a heating furnace at 40 to 100° C. for 10 to 100 hours, for example. This causes the molecular chain of the elastomer to extend due to bonding between free radicals of the elastomer in the mixture so that the molecular weight of the elastomer increases. The molecular weight of the elastomer may be increased in a short period of time by mixing a small amount (e.g., ½ or less of a normal amount) of a crosslinking agent into the mixture and heating (e.g., annealing) the mixture to effect a crosslinking reaction. When increasing the molecular weight of the elastomer by a crosslinking reaction, it is preferable to set the amount of crosslinking agent, the heating time, and the heating temperature so that mixing in the subsequent step is not hindered.

According to the above-described method of producing the carbon fiber composite material, the carbon nanofibers can be more uniformly dispersed in the elastomer by reducing the viscosity of the elastomer before supplying the carbon nanofibers. Specifically, the liquid elastomer of which the molecular weight has been reduced easily enters the space between the aggregated carbon nanofibers as compared with the above-described method in which the carbon nanofibers are mixed into the elastomer having a high molecular weight, whereby the carbon nanofibers can be more uniformly dispersed in the tight milling step. Since a large number of free radicals of the elastomer produced by breakage of the elastomer molecules can be strongly bonded to the surface of the carbon nanofibers, the carbon nanofibers can be more uniformly dispersed in the elastomer. Therefore, the above-described production method enables an equivalent performance to be obtained with a reduced amount of carbon nanofibers, whereby economic efficiency can be improved by saving expensive carbon nanofibers.

EXAMPLES

Examples according to the invention are described below. Note that the invention is not limited to the following examples.

(1) Production of Carbon Nanofibers

A spray nozzle was provided at the top of a vertical heating furnace (inner diameter: 17.0 cm, length: 150 cm). The inner wall temperature (reaction temperature) of the heating furnace was increased to and maintained at 1000° C. A liquid raw material (i.e., benzene containing 4 wt % of ferrocene) (20 g/min) was supplied from the spray nozzle together with hydrogen gas (100 l/min) so that the raw material was directly sprayed onto the wall of the furnace. The spray nozzle had a conical shape (trumpet shape or umbrella shape). The vertex angle of the nozzle was 60°. Ferrocene was pyrolyzed under the above-mentioned conditions to produce iron particles. The iron particles served as seeds so that carbon nanofibers were produced and grown from carbon produced by pyrolysis of benzene. The carbon nanofibers were continuously produced by this method over one hour while scraping off the carbon nanofibers at intervals of five minutes.

The carbon nanofibers thus produced by the vapor growth method were heated at 2800° C. in an inert gas atmosphere to graphitize the carbon nanofibers. The graphitized untreated carbon nanofibers had an average diameter of 87 nm, an average length of 10 micrometers, a tap density of 0.02 g/cm$^3$, and a specific surface area by nitrogen adsorption of 20 m$^2$/g. In Examples 1 to 3, 5, 7, and 8, 1 g of the graphitized untreated carbon nanofibers were placed in a rotary grinder (stainless steel blade, peripheral speed: 180 m/s), and then ground for 0.5 minutes. In Examples 4 and 6, 1 g of the graphitized untreated carbon nanofibers were placed in a rotary grinder (stainless steel blade, peripheral speed: 180 m/s), and then dry-ground for three minutes. In Comparative Example 1, the graphitized untreated carbon nanofibers were used directly. In Table 1, "MWNT" indicates the carbon nanofibers.

(2) Preparation of Carbon Fiber Composite Material Samples of Examples 1 to 8 and Comparative Examples 1 to 4

A predetermined amount of elastomer (100 parts by weight (phr)) shown in Table 1 was supplied to six-inch open rolls (roll temperature: 10 to 20° C., roll distance: 1.5 mm), and wound around the roll. After masticating the elastomer for five minutes, carbon nanofibers or carbon black in an amount shown in Table 1 was supplied to the elastomer. The mixture was then removed from the open rolls. After reducing the roll distance from 1.5 mm to 0.3 mm, the mixture was supplied to the open rolls and then tight-milled five times. The surface velocity ratio of the two rolls was set at 1.1. After setting the roll distance at 1.1 mm, the carbon fiber composite material obtained by tight milling was supplied to the rolls and then sheeted.

The sheeted carbon fiber composite material was press-molded at 90° C. for five minutes to obtain a sheet-shaped carbon fiber composite material (uncrosslinked form) having a thickness of 1 mm. The carbon fiber composite material was subjected to measurements by the Hahn-echo method and the solid-echo method using the pulsed NMR technique. A peroxide was mixed into the carbon fiber composite material obtained by tight milling. After setting the roll distance at 1.1 mm, the mixture was sheeted, and then press-crosslinked at 175° C. and 100 kgf/cm for 20 minutes to obtain a carbon fiber composite material (crosslinked form).

In Table 1, "NR" indicates a natural rubber having a molecular weight of about 3,000,000, and "EPDM" indicates an ethylene-propylene rubber having a molecular weight of about 200,000. In Table 1, "HAF" indicates HAF-grade carbon black.

The apparent density (g/cm$^3$) of the ground carbon nanofibers was measured by the tap method. The results are shown in Table 1.

The specific surface area by nitrogen adsorption (m$^2$/g) of the ground carbon nanofibers was measured using a measuring instrument "NOVA 3000" (nitrogen gas) (manufactured by Yuasa-Ionics Co., Ltd.). The results are shown in Table 1.

(3) Measurement Using Pulsed NMR Technique

The uncrosslinked carbon fiber composite material samples of Examples 1 to 8 and Comparative Examples 1 to 4 were subjected to measurement by the Hahn-echo method using the pulsed NMR technique. A measuring instrument "JMN-MU25" (manufactured by JEOL, Ltd.) was used for the measurement. The measurement was conducted under conditions of an observing nucleus of $^1$H, a resonance frequency of 25 MHz, and a 90-degree pulse width of 2 microseconds. A decay curve was determined while changing Pi in the pulse sequence (90°x-Pi-180°x) of the Hahn-echo method. The measurement was conducted in a state in which the sample was inserted into a sample tube within an appropriate magnetic field range. The measurement temperature was 150° C. The first spin-spin relaxation time (T2$n$/150° C.) and the fraction (fnn) of components having the second spin-spin relaxation time of each sample were determined by this measurement. The measurement results are shown in Table 1. The first spin-spin relaxation times (T2$n$/30° C.) of "NR" and "EPDM" measured in the same manner as described above were 700 microseconds and 520 microseconds, respectively. Each uncrosslinked carbon fiber composite material sample was also subjected to measurement by the solid-echo method using the pulsed NMR technique. A measuring instrument "JMN-MU25" (manufactured by JEOL, Ltd.) was used for the measurement. The measurement was conducted under conditions of an observing nucleus of $^1$H, a resonance frequency of 25 MHz, and a 90-degree pulse width of 2 microseconds. A decay curve was determined in the pulse sequence (90°x-Pi-90°y) of the solid-echo method to detect the spin-spin relaxation time (T2$s$) at 150° C. of each uncrosslinked carbon fiber composite material sample.

(4) Measurement of Hardness

The rubber hardness (JIS-A) of the heat-resistant seal material samples of Examples 1 to 8 and Comparative Examples 1 and 4 was measured in accordance with JIS K 6253. The measurement results are shown in Table 1.

(5) Measurement of 100% Modulus (M100)

The uncrosslinked carbon fiber composite material samples (width: 5 mm, length: 50 mm, thickness: 1 mm) of Examples 1 to 8 and Comparative Examples 1 and 4 were stretched at a rate of 10 mm/min, and the stress (M100: 100% modulus (MPa)) when the sample was deformed by 100% was determined. The measurement results are shown in Table 1. The rate of increase in 100% modulus (M100 increase rate) of the carbon fiber composite material with respect to the 100% modulus of the elastomer per part by weight of the carbon nanofibers mixed into 100 parts by weight of the elastomer was calculated based on the measurement results. For example, the rate of increase in 100% modulus (M100 increase rate) (%) in Example 1 was calculated by dividing the difference in M100 between Example 1 and Comparative Example 3 (3.2-0.9) by the M100 (0.9) of Comparative Example 3, and dividing the resulting value by the amount (20) of MWNT-A of Example 1.

(6) Measurement of Tensile Strength (MPa) and Elongation at Break (%)

A specimen prepared by cutting each crosslinked carbon fiber composite material sample in the shape of a 1A dumbbell was subjected to a tensile test in accordance with JIS K 6251 at a temperature of 23±2° C. and a tensile rate of 500 mm/min using a tensile tester (manufactured by Toyo Seiki Seisaku-sho, Ltd.) to measure the tensile strength (MPa) and the elongation at break (%) of the specimen. The results are shown in Table 1.

(7) Dynamic Viscoelasticity Test

Specimens were prepared by cutting the crosslinked carbon fiber composite material samples of Examples 1 to 8 and Comparative Examples 1 to 4 in the shape of a strip (40×1×5 (width) mm). Each specimen was subjected to a dynamic viscoelasticity test using a dynamic viscoelasticity tester DMS6100 manufactured by SII at a chuck distance of 20 mm, a measurement temperature of −100 to 300° C., a dynamic strain of ±0.05%, and a frequency of 10 Hz in accordance with JIS K 6394 to measure the dynamic modulus of elasticity (E', MPa). Table 1 shows the measurement results for the dynamic modulus of elasticity (E') at a measurement temperature of 30° C. and 200° C.

TABLE 1

| | | | | Ex. 1 | Ex. 2 | Ex. 3 | Ex. 4 | Ex. 5 | Ex. 6 |
|---|---|---|---|---|---|---|---|---|---|
| Elastomer | | Type | | NR | NR | NR | NR | EPDM | EPDM |
| Properties of carbon nanofibers | | Heating temperature | ° C. | 2800 | 2800 | 2800 | 2800 | 2800 | 2800 |
| | | Grinding time | min | 0.5 | 0.5 | 0.5 | 3 | 0.5 | 3 |
| | | Tap density | g/cm$^3$ | 0.031 | 0.031 | 0.031 | 0.06 | 0.031 | 0.06 |
| | | Specific surface area by nitrogen adsorption | m$^3$/g | 22 | 22 | 22 | 30 | 22 | 30 |
| Carbon fiber composite material | Amount | Elastomer | phr | 100 | 100 | 100 | 100 | 100 | 100 |
| | | MWNT | phr | 20 | 60 | 100 | 100 | 100 | 100 |
| | | HAF | phr | 0 | 0 | 0 | 0 | 0 | 0 |
| Pulsed NMR measurement results for uncrosslinked form | Raw material | T2n (30° C.) | μsec | 700 | 700 | 700 | 700 | 470 | 470 |
| | Carbon fiber composite material | T2n (150° C.) | μsec | 2900 | 2750 | 2230 | 1850 | 1700 | 1370 |
| | | fnn (150° C.) | | 0.19 | 0.18 | 0.11 | 0.03 | 0.09 | 0.06 |
| | | T2s (150° C.) | μsec | 520 | 490 | 285 | 210 | 280 | 200 |
| Properties of crosslinked carbon fiber composite | | Hardness JIS A | | 65 | 76 | 85 | 87 | 86 | 90 |
| | | M100 | MPa | 3.2 | 7.5 | 12.4 | 15.8 | 12.7 | 17 |
| | | M100 increase rate | % | 12.8 | 12.2 | 12.8 | 16.6 | 12.0 | 16.4 |

TABLE 1-continued

| material | | | | | | | | |
|---|---|---|---|---|---|---|---|---|
| | Tensile strength | MPa | 16.2 | 13.5 | 14.3 | 19.5 | 15.2 | 23.1 |
| | Elongation at break | % | 520 | 420 | 162 | 100 | 175 | 110 |
| | E' (30° C.) | MPa | 38.0 | 320 | 475 | 380 | 420 | 480 |
| | E' (200° C.) | MPa | 15 | 105 | 151 | 117 | 147 | 119 |

| | | | Ex. 7 | Ex. 8 | Comp. Ex. 1 | Comp. Ex. 2 | Comp. Ex. 3 | Comp. Ex. 4 |
|---|---|---|---|---|---|---|---|---|
| Elastomer | Type | | NR | NR | NR | NR | NR | EPDM |
| Properties of carbon nanofibers | Heating temperature | ° C. | 2800 | 2800 | 2800 | None | None | None |
| | Grinding time | min | 0.5 | 0.5 | None | None | None | None |
| | Tap density | g/cm³ | 0.031 | 0.031 | 0.02 | — | — | — |
| | Specific surface area by nitrogen adsorption | m³/g | 22 | 22 | 20 | 79 | — | — |
| Carbon fiber composite material | Amount Elastomer | phr | 100 | 100 | 100 | 100 | 100 | 100 |
| | MWNT | phr | 150 | 200 | 100 | 0 | 0 | 0 |
| | HAF | phr | 0 | 0 | 0 | 60 | 0 | 0 |
| Pulsed NMR measurement results for uncrosslinked form | Raw material T2n (30° C.) | μsec | 700 | 700 | 700 | 700 | 700 | 470 |
| | Carbon fiber composite material T2n (150° C.) | μsec | 2100 | 1900 | 2460 | 7310 | 6240 | 2220 |
| | fnn (150° C.) | | 0.09 | 0.06 | 0.19 | 0.333 | 0.332 | 0.24 |
| | T2s (150° C.) | μsec | 240 | 190 | 345 | 1940 | 2140 | 720 |
| Properties of crosslinked carbon fiber composite material | Hardness JIS A | | 93 | 96 | 87 | 73 | 42 | 55 |
| | M100 | MPa | 22.5 | — | 11.4 | 6.2 | 0.9 | 1.4 |
| | M100 increase rate | % | 16.0 | — | 11.7 | 9.8 | 1.0 | 1.0 |
| | Tensile strength | MPa | 23.1 | 18.4 | 11.6 | 21 | 4.4 | 1.9 |
| | Elongation at break | % | 110 | 45 | 112 | 192 | 405 | 130 |
| | E' (30° C.) | MPa | 1100 | 1250 | 692 | 10.0 | 1.5 | 3.5 |
| | E' (200° C.) | MPa | 370 | 410 | 192 | 5 | 2.1 | 4.7 |

Ex.: Example
Comp. Ex.: Comparative Example

As shown in Table 1, the following items were confirmed by Examples 1 to 8 according to the invention. Specifically, the ground carbon nanofibers of Examples 1 to 8 according to the invention had a tap density of 0.03 to 0.06 g/cm³. The ground carbon nanofibers of Examples 1 to 8 had a specific surface area by nitrogen adsorption of 22 to 30 m²/g. The crosslinked carbon fiber composite material samples of Examples 1 to 7 had an M100 increase rate higher than those of Comparative Examples 1 to 4. Specifically, the wettability of the carbon nanofibers with the elastomer was improved in Examples 1 to 7. The uncrosslinked carbon fiber composite material samples of Examples 1 to 8 had a spin-spin relaxation time (T2s/150° C.) of 5 to 600 microseconds, a first spin-spin relaxation time (T2n) of 100 to 3000 microseconds, and a fraction (fnn) of components having the second spin-spin relaxation time of 0 to 0.2. In Example 3, the first spin-spin relaxation time (T2n), the fraction (fnn), and the spin-spin relaxation time (T2s) were shorter than those of Comparative Example 1 in which the untreated carbon nanofibers were used.

The crosslinked carbon fiber composite material samples of Examples 1 to 7 according to the invention had an elongation at break at 23° C. of 50% or more, and a rate of increase in 100% modulus with respect to the 100% modulus of the elastomer of 12% or more per part by weight of the carbon nanofibers mixed into 100 parts by weight of the elastomer. In Example 8, since the elongation at break was less than 100%, the measurement could not be conducted.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A method of producing a carbon fiber composite material comprising:
   grinding untreated carbon nanofibers produced by a vapor growth method, the untreated carbon nanofibers being ground at a peripheral speed of 50 to 200 m/s for 0.5 to 60 minutes by a rotary grinder so that the ground carbon nanofibers have a tap density of 1.5 to 10 times higher than a tap density of the untreated carbon nanofibers, wherein the fiber lengths of the untreated carbon nanofibers are reduced to only a small extent in the grinding;
   mixing the carbon nanofibers into an elastomer, wherein specific portions of the elastomer are bonded to highly active sites of the carbon nanofibers through chemical interaction; and
   uniformly dispersing the carbon nanofibers in the elastomer by applying a shear force to obtain a carbon fiber composite material.

2. The method of producing the carbon fiber composite material as defined in claim 1,
   wherein the untreated carbon nanofibers are ground so that the ground carbon nanofibers have a specific surface area by nitrogen adsorption 1.1 to 5.0 times higher than a specific surface area by nitrogen adsorption of the untreated carbon nanofibers.

3. The method of producing the carbon fiber composite material as defined in claim 1, further comprising:
   heating the untreated carbon nanofibers at 2000 to 3200° C. before grinding.

4. The method of producing the carbon fiber composite material as defined in claim 1, wherein the untreated carbon nanofibers have an average diameter of 70 to 100 nm.

5. The method of producing the carbon fiber composite material as defined in claim 1, wherein the carbon nanofibers are dry-ground by utilizing impact and/or a shear force.

* * * * *